(12) United States Patent
Chih

(10) Patent No.: US 7,766,297 B2
(45) Date of Patent: Aug. 3, 2010

(54) DISPLAY DEVICE HAVING A ROTATABLE MECHANISM

(75) Inventor: Ting-Hui Chih, Hua Lian (TW)

(73) Assignee: Qisda Corporation, Taoyuan County (TW)

( * ) Notice: Subject to any disclaimer, the term of this patent is extended or adjusted under 35 U.S.C. 154(b) by 541 days.

(21) Appl. No.: 11/890,339

(22) Filed: Aug. 6, 2007

(65) Prior Publication Data
US 2008/0073472 A1 Mar. 27, 2008

(30) Foreign Application Priority Data
Sep. 22, 2006 (TW) .............................. 95135276 A

(51) Int. Cl.
A47B 91/00 (2006.01)
A47G 29/00 (2006.01)
G06F 1/16 (2006.01)
H05K 5/00 (2006.01)
H05K 7/00 (2006.01)

(52) U.S. Cl. .................. 248/349.1; 248/371; 248/920; 248/921; 248/922; 248/923; 361/679.06; 361/679.07; 361/679.21; 361/679.28

(58) Field of Classification Search ................. 248/370, 248/920, 921, 922, 923; 361/679.06, 679.07, 361/679.21, 679.22, 679.23, 679.24, 679.25, 361/679.27, 679.28, 681, 682; 16/227
See application file for complete search history.

(56) References Cited

U.S. PATENT DOCUMENTS

| 4,478,382 | A | * | 10/1984 | Carrier ..................... 248/184.1 |
| 7,334,295 | B2 | * | 2/2008 | Chou et al. ................... 16/327 |
| 7,370,838 | B2 | * | 5/2008 | Jeong et al. .............. 248/125.7 |
| 2005/0108854 | A1 | * | 5/2005 | Lee et al. ....................... 16/340 |
| 2006/0219849 | A1 | * | 10/2006 | Chiu ........................ 248/125.8 |
| 2007/0258753 | A1 | * | 11/2007 | Chen et al. .................... 403/91 |

* cited by examiner

*Primary Examiner*—J. Allen Shriver, II
*Assistant Examiner*—Christopher Garft

(57) ABSTRACT

A rotatable mechanism includes a U-shaped holding seat having left and right arm, a spring unit having a limiting stem received in a reception space defined between the right arm and a protection sheath extending from the left arm toward the right arm, a control shaft extending from the left arm toward the right arm and a torsion spring sleeved the control shaft to provide a torque, and a U-shaped holding frame fastened securely to the control shaft simultaneous rotation of the holding frame together with the spring unit with respect to the holding seat.

8 Claims, 4 Drawing Sheets

DISPLAY DEVICE HAVING A ROTATABLE MECHANISM

FIELD OF THE INVENTION

The present invention relates to a rotatable mechanism, and more particularly to a rotatable mechanism that is interposed between a support stand and a display panel of a display device. The rotatable mechanism includes a spring unit capable of providing a torque to retain the display panel at a desired angle with respect to the support stand.

BACKGROUND OF THE INVENTION

Due to rapid development in the electronic technology, an LCD device is preferred when compared to a conventional CRT type TV set. The LCD device is in great demand at the market due to its lightweight, thin thickness, small volume and low power consumption. For a desktop computer (personal computer), an LCD device becomes an indispensable part since it serves as a display panel.

Generally, a pivot or rotatable mechanism is employed and designed in the aforementioned desktop computer in order to dispose the LCD device at a desired angle with respect to a support stand to facilitate the user viewing of the LCD device. The desired angle of the LCD device can be adjusted with respect to the support stand according to an individual need. The conventional rotatable mechanism usually includes a holding base and a rotatable frame mounted rotatably on the holding base. The LCD device is mounted securely on the rotatable frame so that the assembly thereof is rotatable relative to the holding base so as to dispose the LCD device at the desired angle.

It is noted that in the aforesaid rotatable mechanism, several friction discs are sandwiched frictionally between the holding base and the rotatable frame in order to provide a friction force that keeps the rotatable frame at the desired angle with respect to the holding base once the rotatable frame is rotated manually to the desired angle. Frequent turning of the rotatable frame relative to the holding base may result in wearing of the friction discs, hence wobbling of the LCD device. In addition, frequent turning of the rotatable frame can also result in heat that cannot be dissipated effectively. The conventional rotatable mechanism therefore fails to keep the LCD device at the desired angle due to wearing of the friction discs, and tends to dysfunction of the conventional rotatable mechanism.

SUMMARY OF THE INVENTION

Therefore, it is the object of the present invention to provide a rotatable mechanism for use in a desktop computer. The rotatable mechanism includes a holding seat, a holding frame and a limiting stem that can be rotated together with the holding frame against torsion force of a spring unit to a desired angle with respect to the holding seat.

According to one aspect of the present invention, a rotatable mechanism for a display device is provided. The display device includes a display panel and a support stand. The rotatable mechanism is interposed between the display panel and the support stand for holding the display panel at a desired angle with respect to the support stand. The rotatable mechanism includes a generally U-shaped holding seat, a spring unit, a generally U-shaped holding frame and a pivot axle. The holding seat has a left arm, a right arm spaced apart from the left arm and a hollow protection sheath extending from the left arm toward and cooperating with the right arm to define a reception space between the right arm and the protection sheath. The spring unit includes a limiting stem received in the reception space, a control shaft projecting from the limiting stem toward the left arm parallel to and exposed from the protection sheath, and a torsion spring sleeved around the control shaft. The holding frame is disposed on the holding seat, and includes a base adjacent to the protection sheath, left and right arms overlapping the left and right arms of the holding seat, and a fastener screw for fastening the base securely to the control shaft so as to permit simultaneous rotation of the holding frame together with the spring unit relative to the holding seat. The pivot axle extends through the left and right arms of the holding seat and frame, the limiting stem and the protection sheath to permit relative movement between the holding seat and the holding frame. Rotation of the holding frame to a predetermined angle with respect to the holding seat results in turning of the limiting stem relative to the holding seat, which, in turn, results in twisting of the torsion spring so as to result in variation of the torque of the torsion spring for turning the holding frame.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTIONS OF THE PREFERRED EMBODIMENT

Figure 1:
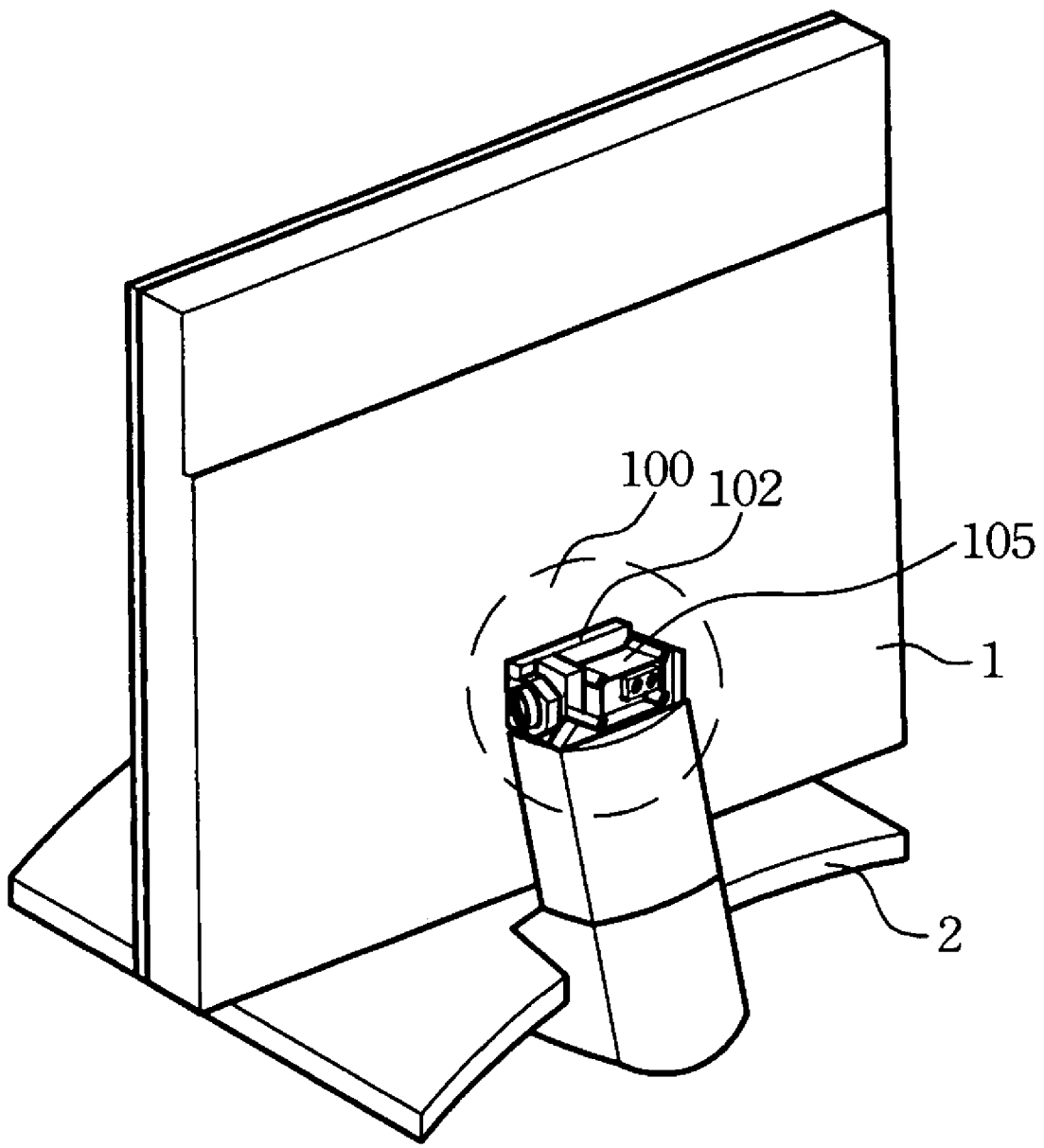
FIG. 1 is a perspective view of an LCD device provided with a rotatable mechanism of the present invention.

Referring to FIG. 1, a rotatable mechanism 100 of the present invention is utilized between a display panel 1 (generally an LCD device) and a support stand 2 of a display device in order to dispose the display panel 1 at a desired angle with respect to the support stand 2.

Figure 2:
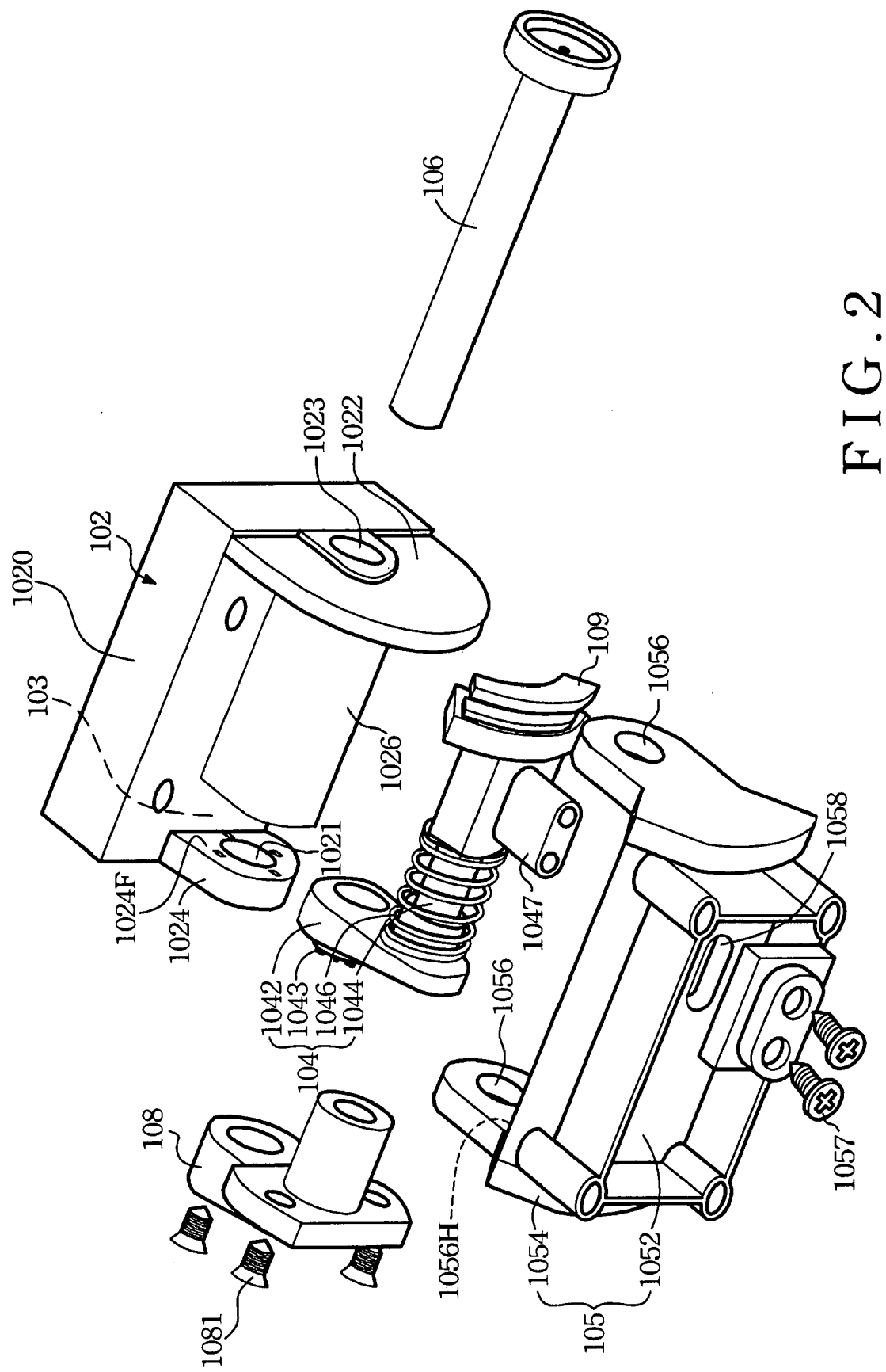
FIG. 2 is an exploded view illustrating the rotatable mechanism of the present invention.

Referring to FIG. 2, the rotatable mechanism 100 of the present invention includes a holding seat 102, a spring unit 104, a holding frame 105 and a pivot axle 106.

The holding seat 102 is generally U-shaped, and includes a base 1020, a left right arm 1022, a right arm 1024 spaced apart from the left arm 1022 and a hollow protection sheath 1026 extending from the left arm 1022 parallel to the base 1020 and cooperating with the right arm 1024 to define a reception space 103 therebetween. The protection sheath 1026 cooperating with the base 1020 defines an axle chamber 1023 therebetween. Preferably, the left arm 1022 of the holding seat 102 has a dimension greater than the right arm 1024, the purpose thereof is described in the following statements. Each of the left and right arms 1022, 1024 of the holding seat 102 is formed with a mounting hole 1021, the purpose of which will be explained in the following paragraphs.

The spring unit 104 includes a limiting stem 1042, a control shaft 1044 and a torsion spring 1046. The limiting stem 1042 has an inner portion received fittingly in the reception space 103 and an outer portion exposed from the reception space 103. The control shaft 1044 projects from the outer portion of the limiting stem 1042 toward the left arm 1022 such the control shaft 1044 is parallel to and is exposed from the protection sheath 1026. The torsion spring 1046 is sleeved around the control shaft 1044, and has a first end fixed to the limiting stem 1042 and a second end. The spring unit 104 further includes a protrusion 1047 fixed on the control shaft 1044. The second end of the torsion spring 1046 is fixed to the protrusion 1047 so as to provide a torque on the control shaft 1044 in the normal condition, i.e. when the spring unit 104 is not rotated relative to the holding seat 102. Rotation of the limiting stem 1042 (hence the spring unit 104) with respect to the holding seat 102 varies the twisting force of the torsion spring 1046, hence variation in the torque.

As illustrated in FIG. 2, the right arm 1024 of the holding seat 102 has an inner side face 1024F formed with a plurality of recesses around the mounting hole 1021. The inner portion of the limiting stem 1042 has an outer side face that abuts against the inner side face 1024F of the right arm 1024 of the holding seat 102 and that is formed with a circle of engaging tongues 1043 for engaging the recesses respectively so as to retain the holding frame 105 at a predetermined angle against torsion force of the torsion spring 1046 in case the holding frame 105 is rotated to the predetermined angle with respect to the holding seat 102.

The holding frame 105 is generally U-shaped, is disposed on the holding seat 102, and includes a base 1052, left and right arms 1054, and two fastener screws 1057. Once disposed on the holding seat 102, the base 1052 of the holding frame 105 is located adjacent to the protection sheath 1026 and is further formed with a holding aperture 1058 receiving the protrusion 1047, thereby permitting the holding frame to rotate together with the control shaft 1044. The left and right arms 1054 extend from two opposite ends of the base 1052 to overlap the left and right arms 1022, 1024 of the holding seat 102. The left and right arms 1054 of the holding frame 105 are formed with two axle holes 1056 aligned respectively with the mounting holes 1021 of the left and right arms 1022, 1024 of the holding seat 102. The pivot axle 106 extends through the holes 1021, 1056 in the left and right arms of the holding seat and frame 102, 105, the limiting stem 1042 and the protection sheath 1026 to permit relative movement between the holding seat 102 and the holding frame 105. Two fastener screw 1057 are inserted through the base 1052 of the holding frame 105 for fastening securely to the protrusion 1047 of the control shaft 1044, thereby coupling the holding frame 105 and the spring unit 104 to permit simultaneous rotation of the holding frame 105 and the spring unit 104 relative to the holding seat 102.

Figure 4:
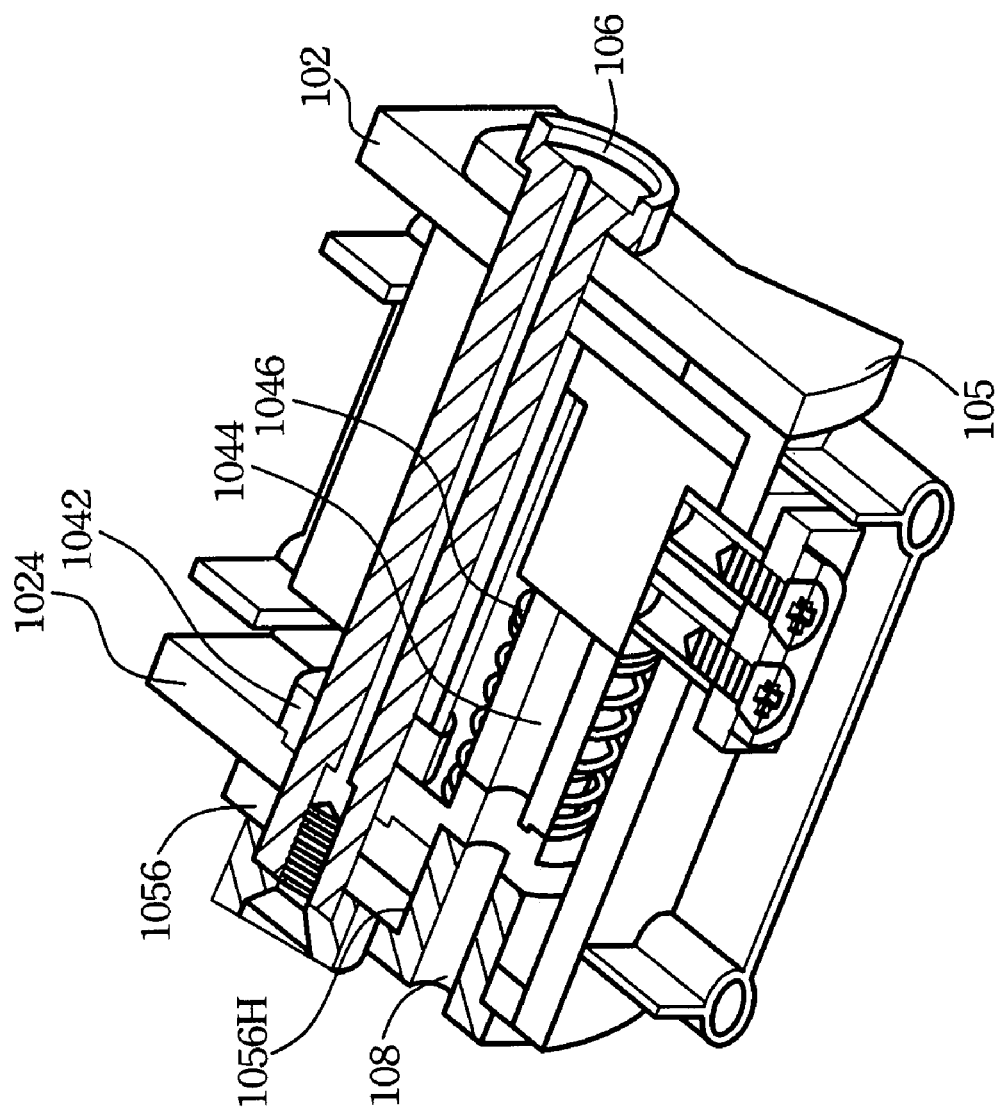
FIG. 4 is a cross sectional view of the rotatable mechanism of the present invention taken along line a-a' in FIG. 3.

Moreover, the right arm 1054 of the holding frame 105 is further formed with a bushing hole 1056H spaced from the axle hole 1056 (see FIGS. 2 and 4). The rotatable mechanism 100 of the present invention further includes a bushing unit 108 disposed exterior to the right arm 1054 of the holding frame 105. The bushing unit 108 has a tubular section inserted through the bushing hole 1056H in the right arm 1054 of the holding frame 105 for coupling rotatably to one free end of the control shaft 1044 to facilitate co-rotation of the control shaft 1044 with the limiting stem 1042 relative to the holding seat 102. A fastener screw 1081 is inserted through the bushing unit 108 to fasten threadedly the distal end of the pivot axle 106, thereby preventing disengagement of the holding frame 105 and the spring unit 104 relative to the holding seat 102.

Note that the rotatable mechanism 100 of the present invention further includes a friction disc 109 fixed to one free end of the control shaft 1044 and in tight abutment against the left arm 1022 of the holding seat 102 due to dimension difference between the left and right arms 1022, 1024 of the holding seat 102. At this time, a friction force is generated between the control shaft 1044 and the left arm 1022 of the holding seat 102 due to aforementioned tight abutment, thereby enhancing retention of the holding frame 105 at the predetermined angle with respect to the holding seat 102.

Figure 3:
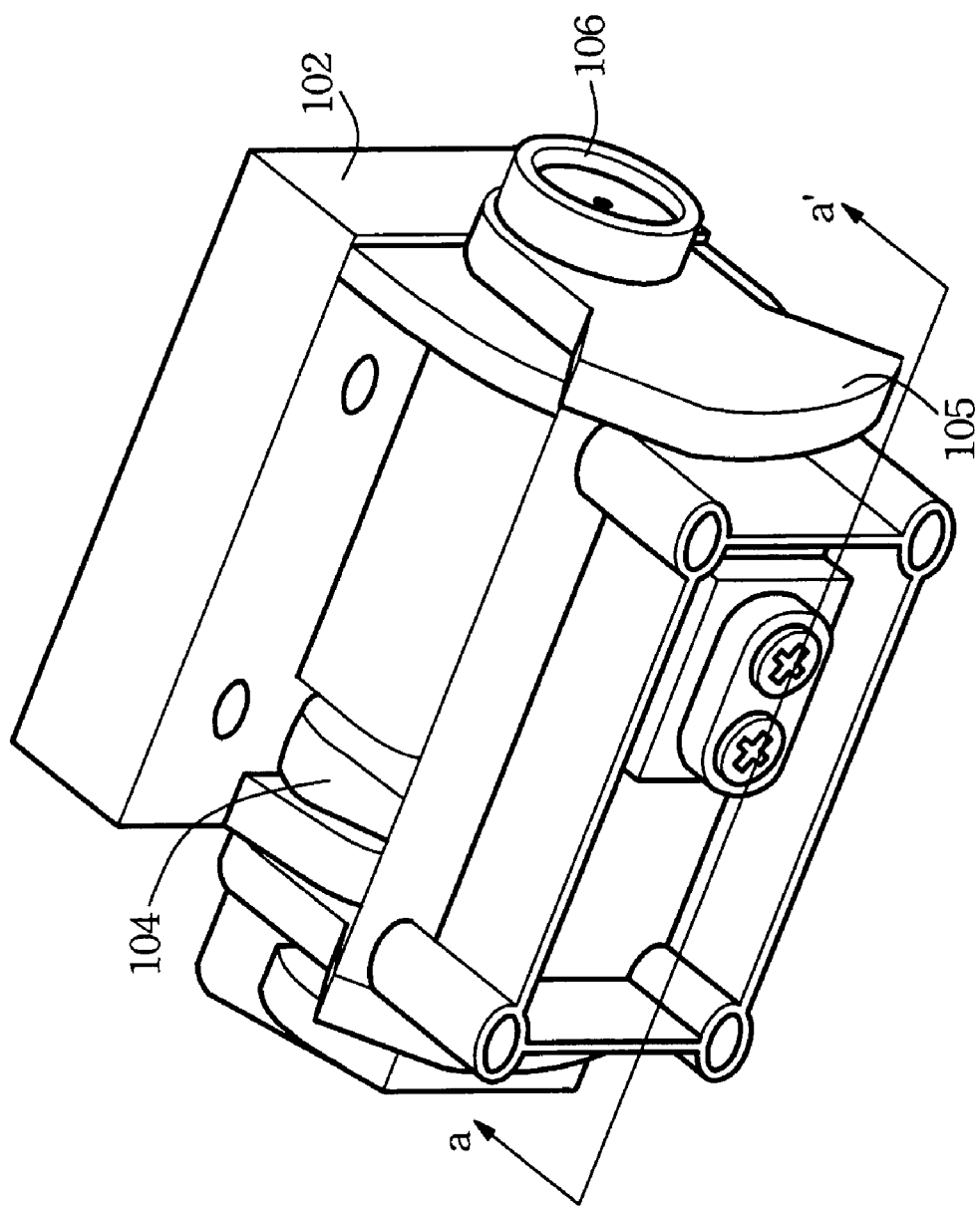
FIG. 3 is a perspective assembled view of the rotatable mechanism of the present invention.

FIG. 3 is a perspective assembled view of the rotatable mechanism of the present invention. FIG. 4 is a cross sectional view of the rotatable mechanism of the present invention taken along line a-a' in FIG. 3.

As illustrated, after assembly of the holding seat 102, the spring unit 104 and the holding frame 105 by means of the axle 106 and the bushing unit 108, rotation of the holding frame 105 to the predetermined angle with respect to the holding seat 102 results in turning of the limiting stem 1042 relative to the holding seat 102 (removing the tongues 1043 from the recesses), which, in turn, results in variation in the torque provided by the torsion spring 1046 so as to enable the torsion spring 1046 for turning the holding frame 105 back to its initial position. However, the holding frame 105 can be retained at the predetermined angle by virtue of the engaging tongues 1043 and the recesses formed on the inner side face 1024F of the right arm 1024 of the holding seat 102 and the tight abutment of the friction disc 109 against the left arm 1022 of the holding seat 102.

In other words, after fixing two ends of the torsion spring 1046 on the limiting stem 1042 and the protrusion 1047, the torsion spring 1046 provides not only the torque for turning the holding frame 105 to its initial position relative to the holding seat 102, but also two opposite pushing forces along the longitudinal direction of the control shaft 1044 for pushing the limiting stem 1042 and the friction disc 109 respectively so as to enhance the tight abutment between the right arm 1024 of the holding seat 102 and the limiting stem 1042, and between the friction disc 109 and the left arm 1054 of the holding frame 105. Thus, the engagement of the tongues 1043 into the recesses in the right arm 1024 of the holding seat 102 provides stable retention of the holding frame 105 at the predetermined angle.

When the rotatable mechanism 100 of the present invention is utilized in the display device, one of the holding seat and frame 102, 105 can be fixed on the display panel 1 while the other one of the holding seat and frame 102, 105 can be fixed on the support stand 2 to provide relative movement therebetween.

The advantages provided by the rotatable mechanism 100 of the present invention are as follows:

(1) The friction disc 109 serves and provides minor assistance for retention of the holding frame 105 at the predetermined angle. Since the spring unit 1046 provides the torque, wearing of the friction disc 109 after long time use does not affect retention of the holding frame 105 at the predetermined angle.

(2) Since the torsion spring 1046 is cheap in cost, the manufacturing expense can be lowered.

(3) In order to cut down the manufacturing expense, the second end of the torsion spring 1046 can be mounted directly on the control shaft 1044 after removal of the protrusion 1047 from the control shaft 1044, thereby saving the material and the cost for forming the protrusion 1047.

(4) Unlike to the prior art rotatable mechanism, several friction discs are not required and employed in the rotatable mechanism 100 of the present invention, and the cost thereof can be reduced subsequently.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A rotatable mechanism for a display device that includes a display panel and a support stand, the rotatable mechanism being interposed between the display panel and the stand for holding the display panel at a desired angle with respect to the support stand, the rotatable mechanism comprising:
   a holding seat of generally U-shaped having a left arm, a right arm spaced apart from said left arm and a hollow protection sheath extending from said left arm and cooperating with said right arm to define a reception space therebetween;
   a spring unit including a limiting stem received in said reception space, a control shaft projecting from said limiting stem toward said left arm parallel to and exposed from said protection sheath, and a torsion spring sleeved around said control shaft for providing a torque;
   a holding frame of generally U-shaped disposed on said holding seat, and including a base adjacent to said protection sheath, left and right arms overlapping said left and right arms of said holding seat, and a fastener screw for fastening said base securely to said control shaft so as to permit simultaneous rotation of said holding frame together with said control shaft and said limiting stem with respect to said holding seat;
   a pivot axle extending through in said left and right arms of said holding seat and said holding frame, said limiting stem and said protection sheath to permit relative movement between said holding seat and said holding frame; and
   wherein, rotation of said holding frame to a predetermined angle with respect to said holding seat results in turning of said limiting stem relative to said holding seat, which, in turn, results in twisting of said torsion spring so as to result in variation of the torque of said torsion spring for turning said holding frame relative to said holding seat.

2. The rotatable mechanism according to claim 1, wherein said holding seat has a base interconnecting said left and right arms and extending parallel to said protection sheath, said left arm of said holding seat having a dimension greater than said right arm, each of said left and right arms of said holding seat being formed with a mounting hole to permit extension of said pivot axle therethrough for coupling said holding seat and frame together.

3. The rotatable mechanism according to claim 2, wherein said right arm of the holding frame is further formed with a bushing hole spaced from said axle hole, the rotatable mechanism further comprising a bushing unit disposed exterior to said right arm of the holding frame, said bushing unit including a tubular section inserted through said bushing hole in said right arm of said holding frame for coupling rotatably to a first free end of said control shaft to facilitate co-rotation of said control shaft with said limiting stem relative to said holding seat and a fastener screw inserted through said holes in said right arms of said holding seat and frame to fasten threadedly a distal end of said pivot axle.

4. The rotatable mechanism according to claim 3, further comprising a friction disc fixed to a second free end of said control shaft and in tight abutment against the left arm of the holding seat due to different dimension between said left and right arms to provide a friction force for enhancing retention of said holding frame at said predetermined angle with respect to said holding seat.

5. The rotatable mechanism according to claim 2, wherein said right arm of said holding seat has an inner side face formed with a plurality of recesses around said mounting hole, said limiting stem having an outer side face that abuts against said inner side face of said right arm of said holding seat and that is formed with a circle of engaging tongues for engaging said recesses respectively so as to retain said holding frame at said predetermined angle against torsion force of said torsion spring.

6. The rotatable mechanism according to claim 2, wherein said base, said left arm, said right arm and said protection sheath of said holding seat are integrally formed as a single piece.

7. The rotatable mechanism according to claim 1, wherein said base of said holding frame is formed with a holding aperture, said spring unit further including a protrusion fixed on said control shaft and extending into said holding aperture, said fastener screw extending through said base of said holding frame for fastening said protrusion, thereby coupling said holding frame to said spring unit to permit simultaneous rotation of said holding frame together with said spring unit relative to said holding seat.

8. The rotatable mechanism according to claim 7, wherein said torsion spring has a first end fixed to said limiting stem and a second end fixed to said protrusion so as to provide said variation of the torque when said holding frame and said sprint unit are rotated simultaneously to said predetermined angle with respect to said holding seat.

* * * * *